(12) United States Patent
Fujita et al.

(10) Patent No.: US 12,353,023 B2
(45) Date of Patent: Jul. 8, 2025

(54) CLEANING TOOL

(71) Applicant: FUJIKURA LTD., Tokyo (JP)

(72) Inventors: Shunsuke Fujita, Chiba (JP); Kunihiko Fujiwara, Chiba (JP)

(73) Assignee: FUJIKURA LTD., Tokyo (JP)

( * ) Notice: Subject to any disclaimer, the term of this patent is extended or adjusted under 35 U.S.C. 154(b) by 308 days.

(21) Appl. No.: 17/778,392

(22) PCT Filed: Apr. 7, 2021

(86) PCT No.: PCT/JP2021/014759
§ 371 (c)(1),
(2) Date: May 19, 2022

(87) PCT Pub. No.: WO2021/220750
PCT Pub. Date: Nov. 4, 2021

(65) Prior Publication Data
US 2022/0397724 A1    Dec. 15, 2022

(30) Foreign Application Priority Data
Apr. 27, 2020  (JP) .................... 2020-078184

(51) Int. Cl.
G02B 6/38    (2006.01)
(52) U.S. Cl.
CPC ........... G02B 6/3866 (2013.01); G02B 6/381 (2013.01); *B08B 2240/02* (2013.01)
(58) Field of Classification Search
CPC .................................................. G02B 6/3866
See application file for complete search history.

(56) References Cited

U.S. PATENT DOCUMENTS 7,147,490 B2 * 12/2006 Gerhard ................. B08B 11/02
                                                 439/85
2003/0098045 A1 * 5/2003 Loder ................... G02B 6/3898
                                                 15/210.1
(Continued)

FOREIGN PATENT DOCUMENTS

CN    103797390 A    5/2014
CN    105122108 A    12/2015
(Continued)

OTHER PUBLICATIONS

International Search Report issued in corresponding International Application No. PCT/JP2021/014759 dated May 25, 2021 (4 pages).

*Primary Examiner* — Marc Carlson
(74) *Attorney, Agent, or Firm* — Osha Bergman Watanabe & Burton LLP

(57) ABSTRACT

A cleaning tool includes: a head including: a pressing part that presses a cleaning element against an object to be cleaned in a pressing direction, and having a first dimension in a width direction orthogonal to the pressing direction; and a neck part having a second dimension smaller than the first dimension in the width direction; and a housing that houses the head such that the pressing part and the neck part protrude from the housing in the pressing direction. A length of the housing in the width direction is equal to or greater than a length of protrusion of the pressing part protruding from the housing in the pressing direction.

7 Claims, 10 Drawing Sheets

(56) References Cited

U.S. PATENT DOCUMENTS

| | | | | |
|---|---|---|---|---|
| 2005/0286853 A1* | 12/2005 | Fujiwara | ................... | B08B 1/30 |
| | | | | 385/134 |
| 2008/0034519 A1* | 2/2008 | Fujiwara | ................... | B08B 1/30 |
| | | | | 15/104.001 |
| 2015/0362680 A1* | 12/2015 | Nakane | ..................... | B08B 1/10 |
| | | | | 15/105 |
| 2018/0088285 A1* | 3/2018 | Braun | ................... | G02B 6/3866 |

FOREIGN PATENT DOCUMENTS

| | | | | | |
|---|---|---|---|---|---|
| JP | 2003241015 A | * | 8/2003 | | |
| JP | 2004-151402 A | | 5/2004 | | |
| JP | 2004151401 A | * | 5/2004 | ............. | B08B 1/008 |
| JP | 2005099451 A | * | 4/2005 | ............... | B08B 1/00 |
| JP | 2008242124 A | * | 10/2008 | ............. | B08B 1/008 |
| JP | 2010008992 A | * | 1/2010 | | |
| JP | 5439557 B2 | | 3/2014 | | |
| JP | 2016-188927 A | | 11/2016 | | |
| JP | 2017058583 A | * | 3/2017 | | |
| JP | 7252414 B2 | * | 4/2023 | ............... | B08B 1/30 |
| WO | WO-2021029388 A1 | * | 2/2021 | ............. | B08B 1/006 |

* cited by examiner

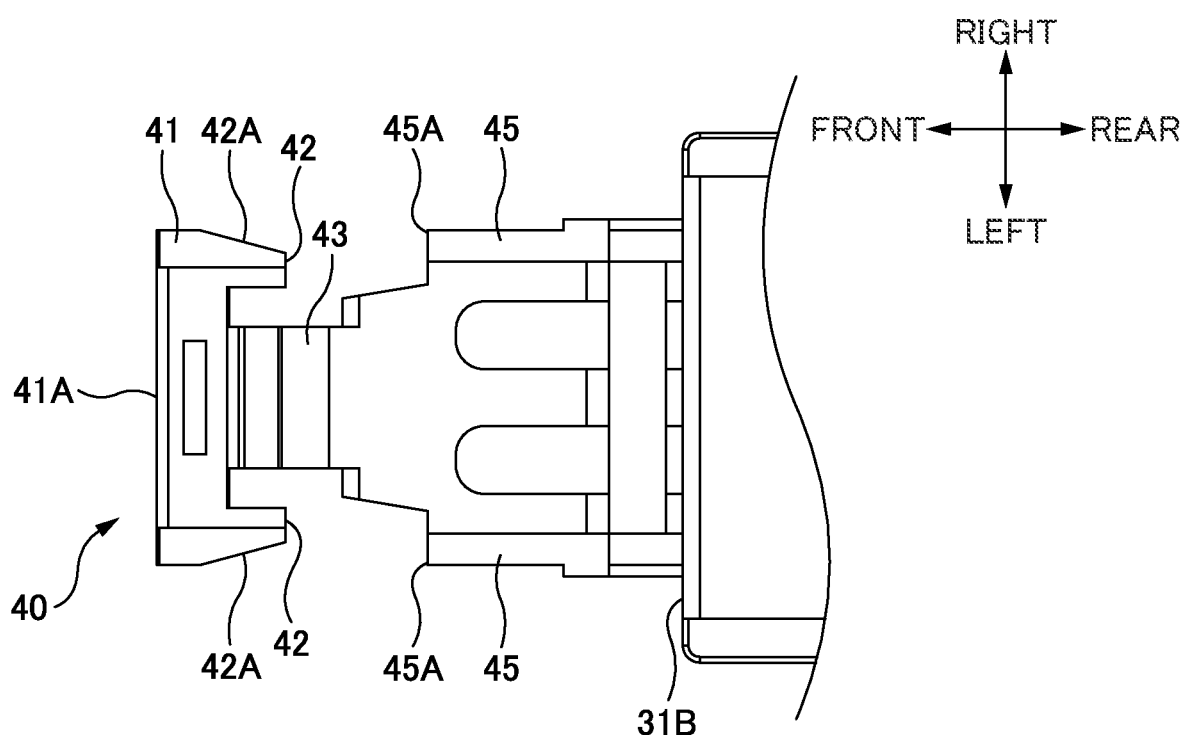
FIG. 8A
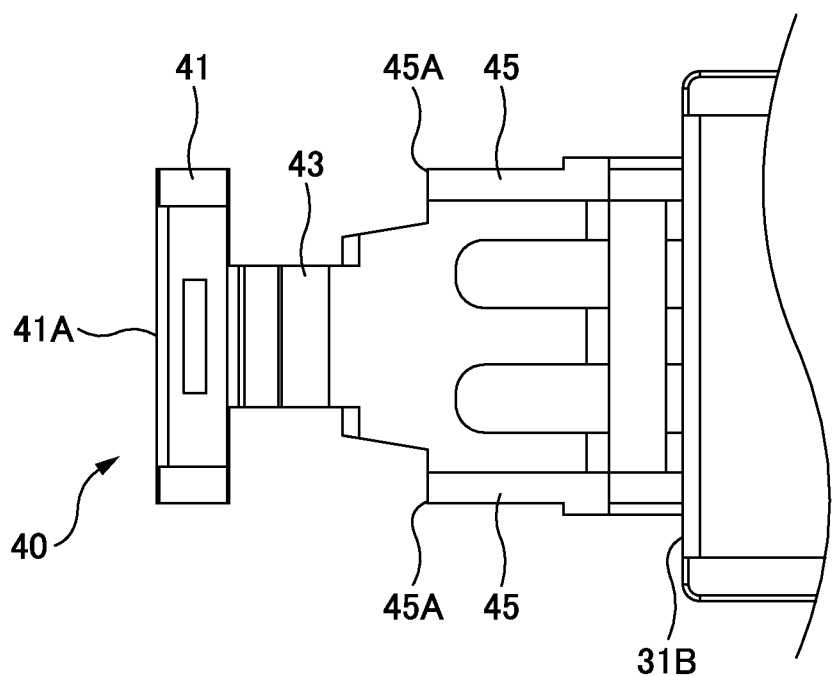
FIG. 8B (REFERENCE EXAMPLE)

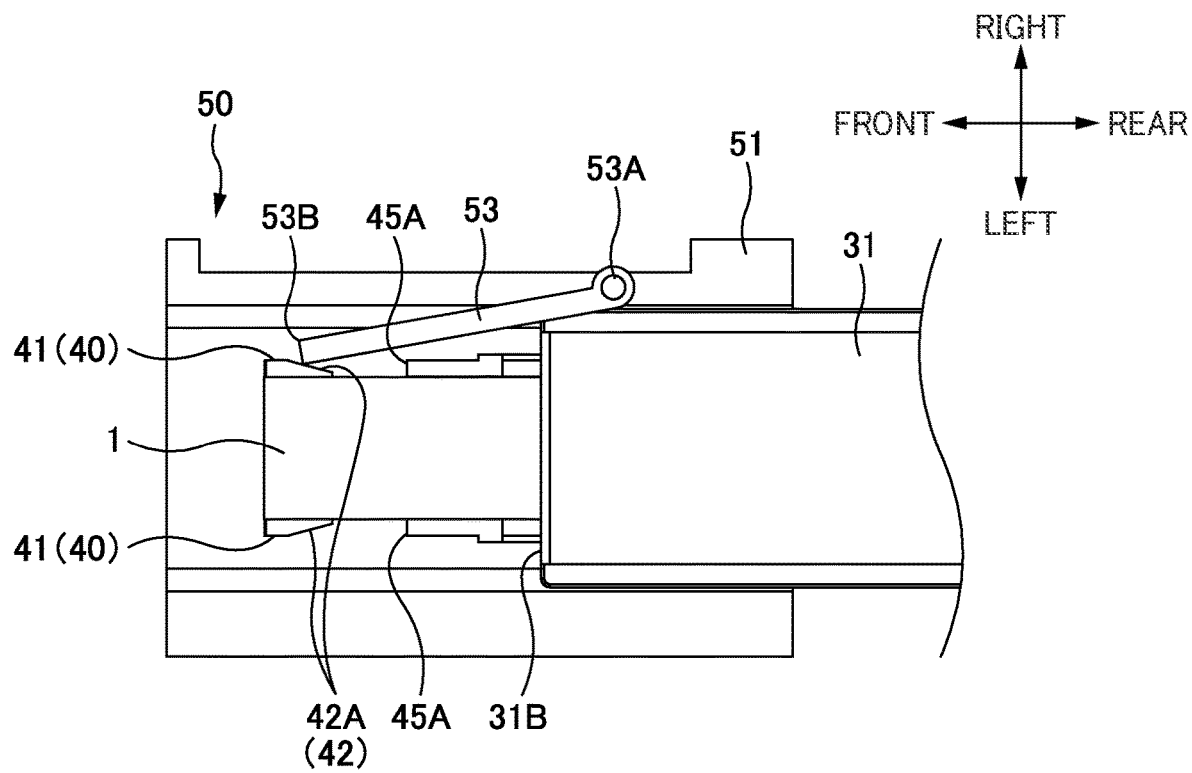
FIG. 9A
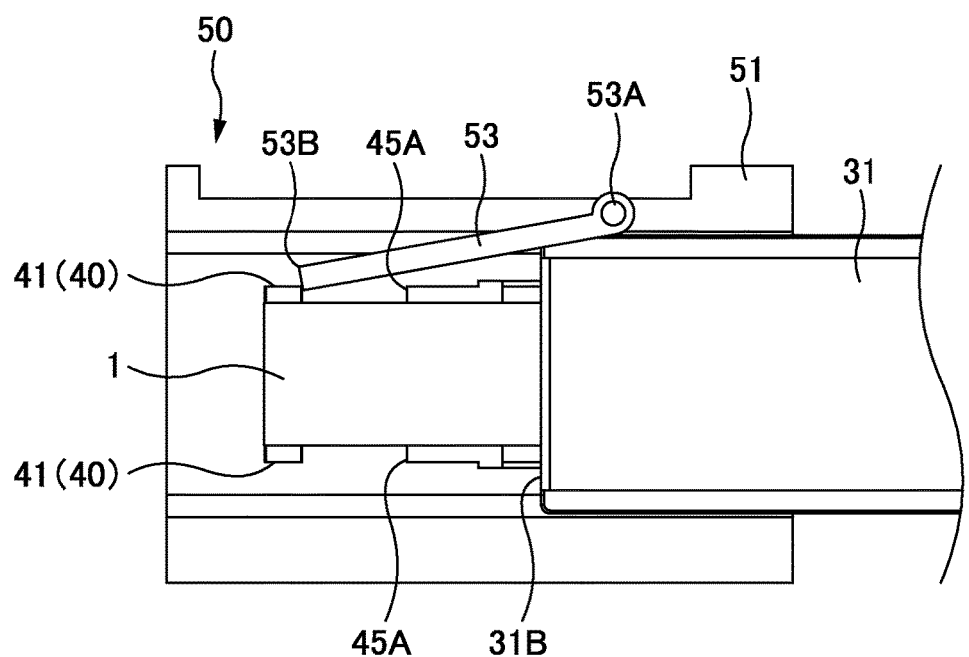
FIG. 9B (REFERENCE EXAMPLE)

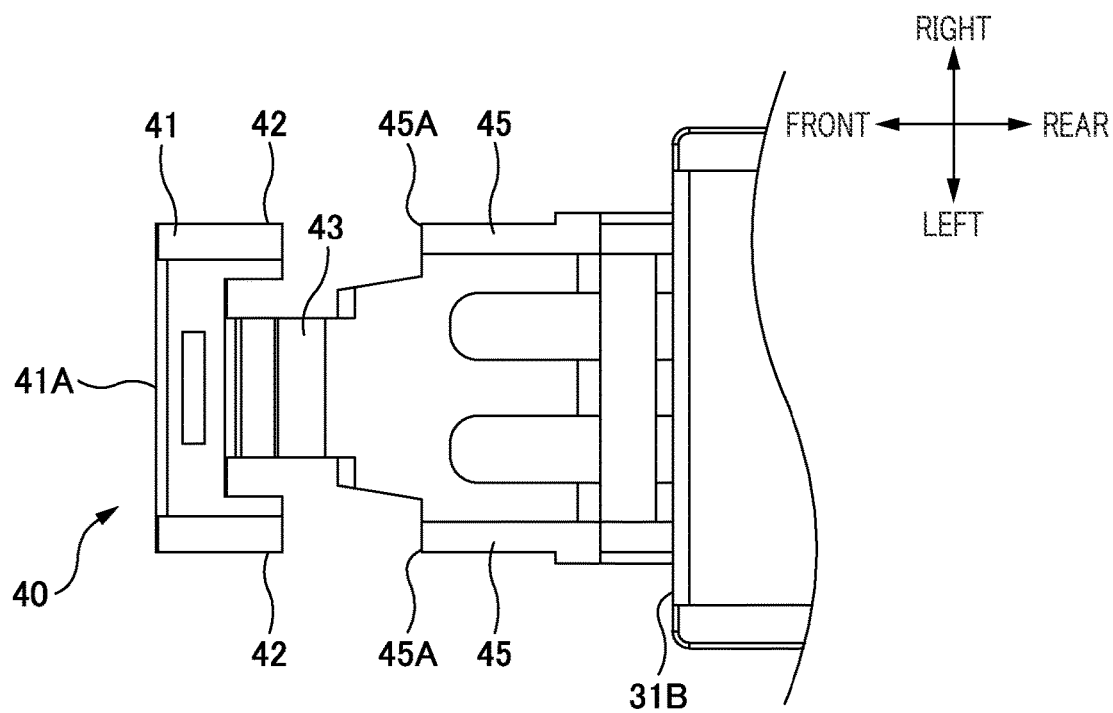
FIG. 10A (MODIFIED EXAMPLE)
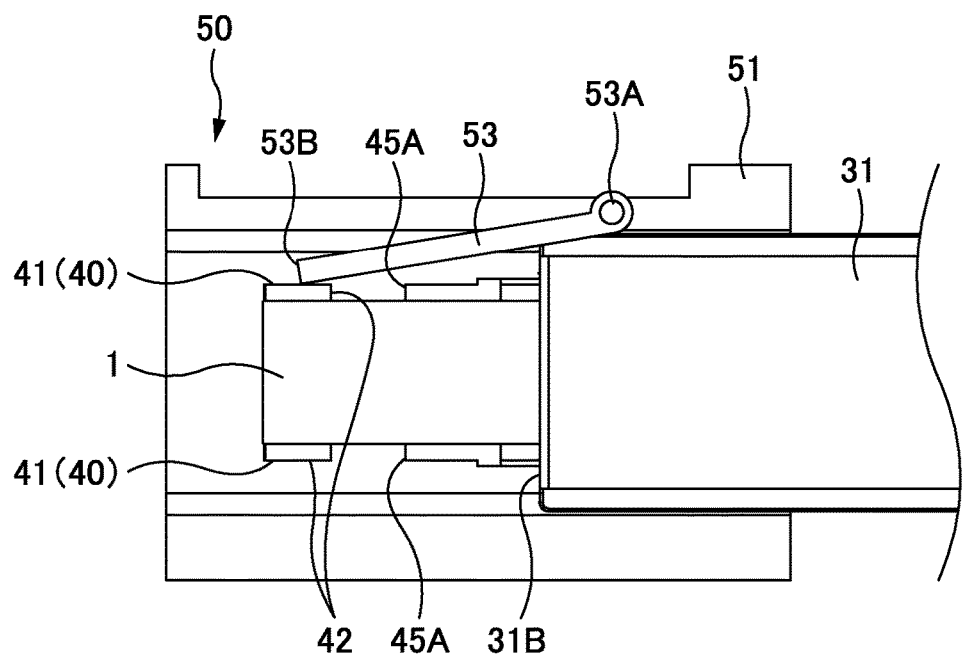
FIG. 10B (MODIFIED EXAMPLE)

CLEANING TOOL

BACKGROUND

Technical Field

The present disclosure relates to a cleaning tool.

Description of Related Art

Patent Literature 1 discloses a cleaning tool for cleaning an optical connector. The cleaning tool disclosed in Patent Literature 1 includes a tool body and an extension part having a head. The cleaning tool is used to clean an end face of an optical connector with a cleaning element by relatively moving the tool body with respect to the extension part in a state where the cleaning element is pressed against the optical connector with the head. The cleaning element is supplied and collected by employing the relative movement between the tool body and the extension part.

Patent Literature 2 discloses a shutter-equipped optical connector.

PATENT LITERATURES

Patent Literature 1: Japanese Patent No. 5439557
Patent Literature 2: Japanese Patent Application Laid-open Publication No. 2016-188927

SUMMARY

At the time of cleaning a shutter-equipped optical connector with a cleaning tool, the shutter may get caught on the head of the cleaning tool, which may prevent the cleaning tool from being detached.

One or more embodiments of the present invention may suppress the shutter from getting caught on the head.

One or more embodiments of the present invention provide a cleaning tool having: a head including a pressing part configured to press a cleaning element against an object to be cleaned, and a neck part having a dimension narrower than the pressing part in a width direction orthogonal to a pressing direction in which the cleaning element is to be pressed against the object to be cleaned; and a housing configured to house the head in a state where the pressing part and the neck part are protruding in the pressing direction. A length of the housing in the width direction is equal to or greater than a protrusion length from the housing to the pressing part protruding therefrom.

Other features of the present invention will be disclosed in the present Description with reference to the drawings.

According to one or more embodiments of the present invention, it is possible to suppress a shutter from getting caught on a head.

BRIEF DESCRIPTION OF THE DRAWINGS

FIG. 8A is an explanatory diagram of the head of one or more embodiments.

FIG. 8B is an explanatory diagram of a head of a reference example.

FIG. 9A is an explanatory diagram illustrating a state where the cleaning tool of one or more embodiments is being withdrawn from an optical connector.

FIG. 9B is an explanatory diagram illustrating a state where the cleaning tool of the reference example is being withdrawn from an optical connector.

FIG. 10A is an explanatory diagram of a head of a modified example.

FIG. 10B is an explanatory diagram illustrating a state where a cleaning tool of the modified example is being withdrawn from an optical connector.

DETAILED DESCRIPTION OF THE EMBODIMENTS

Embodiments

Figure 1A:
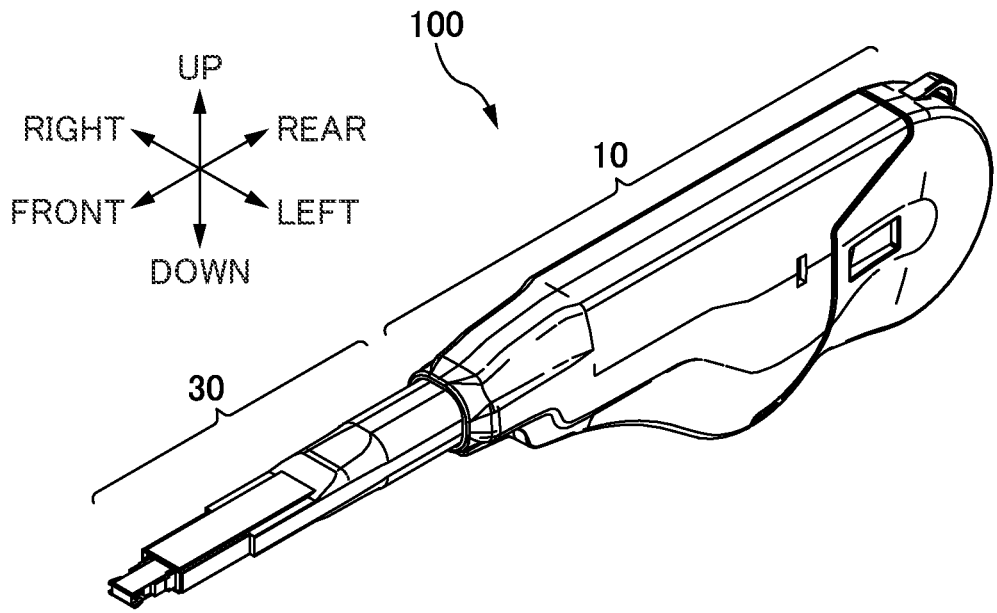
FIG. 1A is a perspective view of a cleaning tool according to one or more embodiments.
Figure 1B:
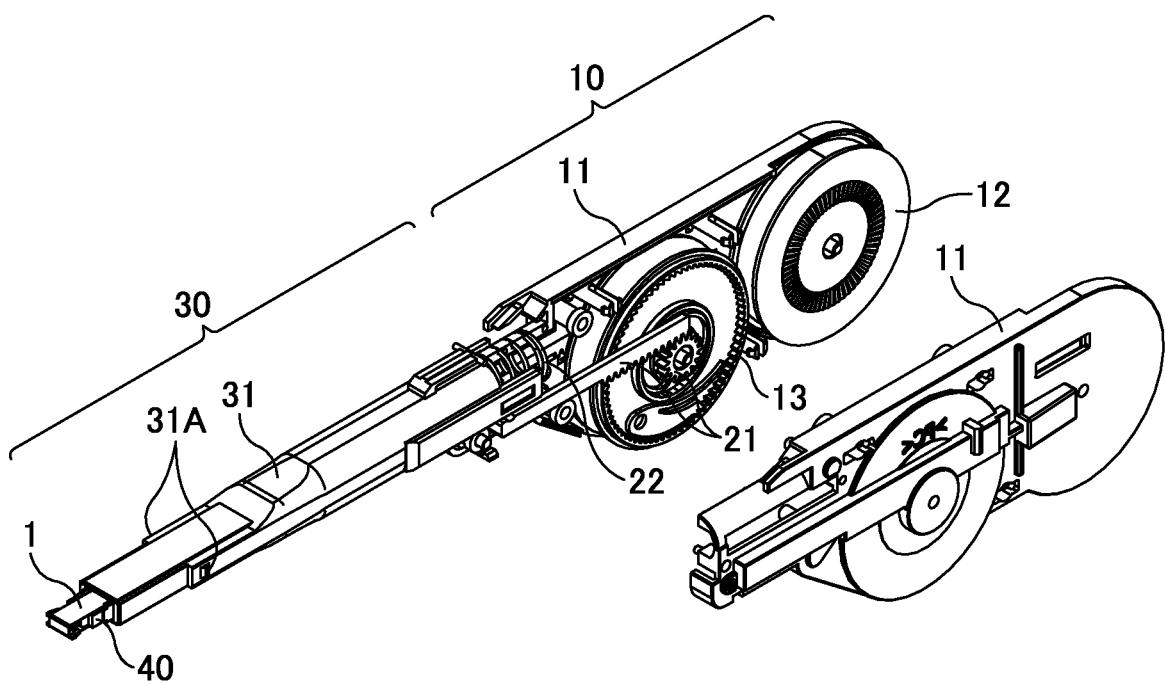
FIG. 1B is an exploded view of the cleaning tool of one or more embodiments with its cover removed.
Figure 2A:
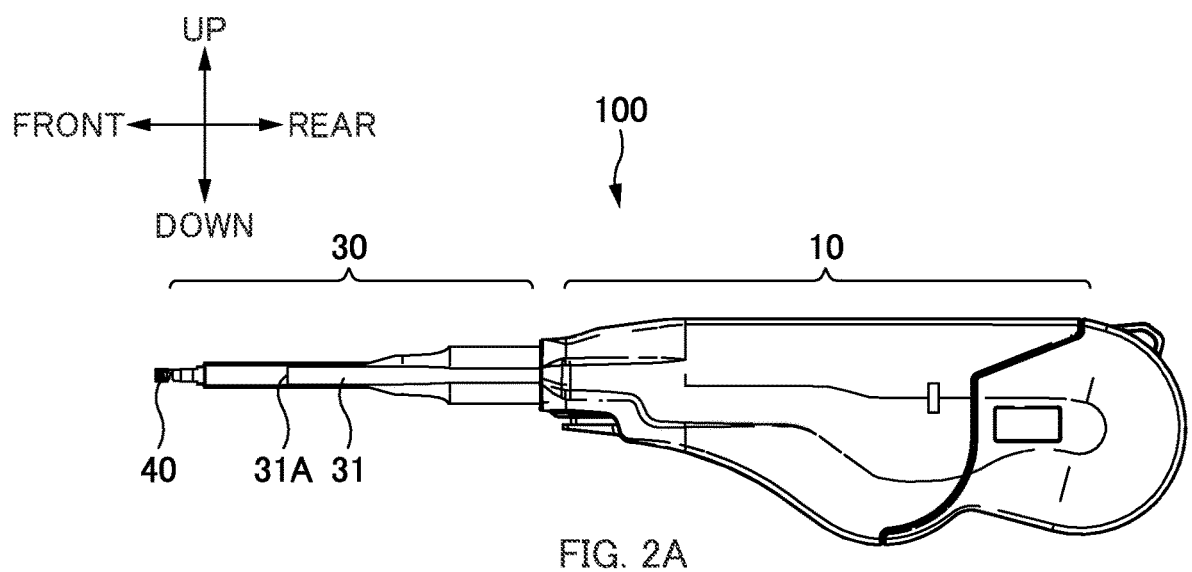
FIG. 2A is a side view of the cleaning tool in a normal state.
Figure 2B:
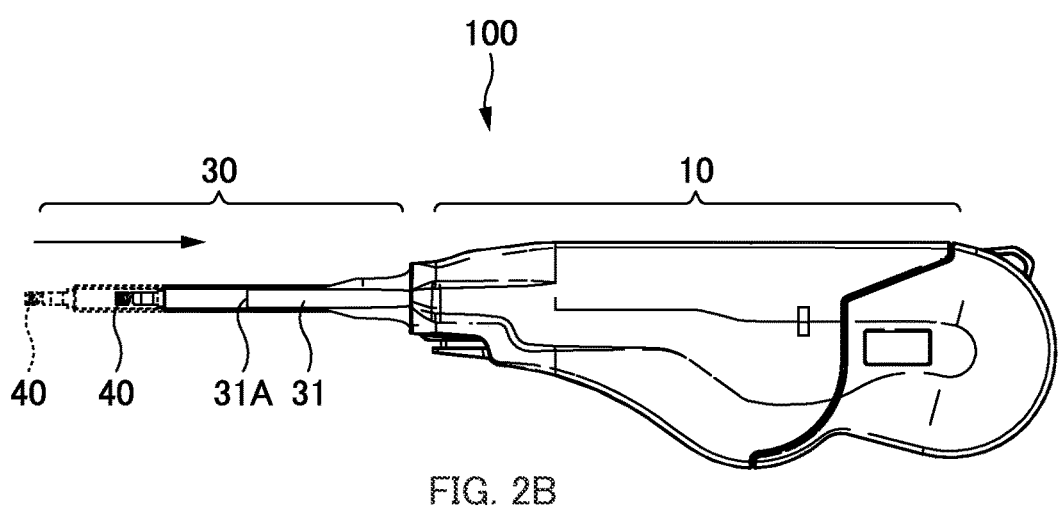
FIG. 2B is a side view of the cleaning tool in a pushed state.
Figure 2C:
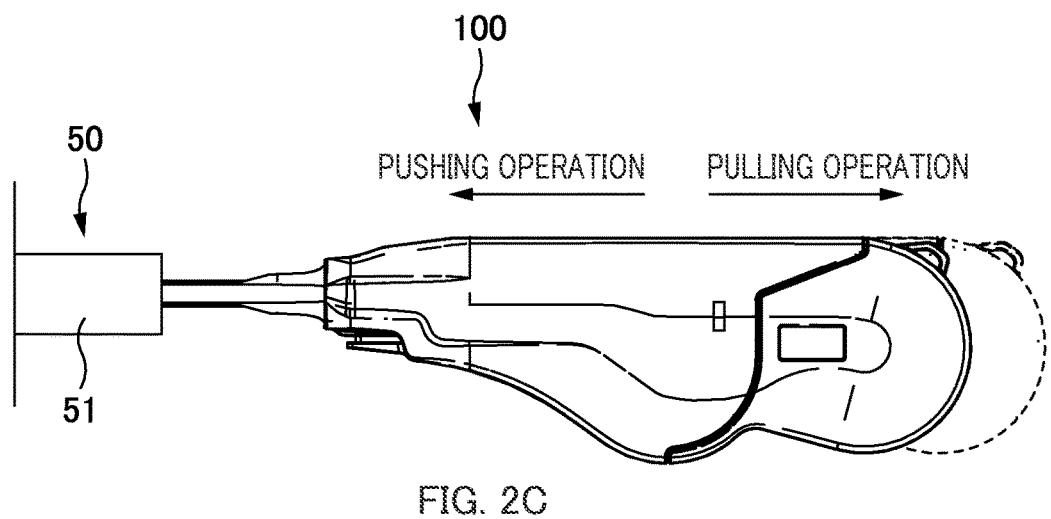
FIG. 2C is an explanatory diagram of a cleaning operation.

Overall Configuration:

FIG. 1A is a perspective view of a cleaning tool 100 according to one or more embodiments. FIG. 1B is an exploded view of the cleaning tool 100 of one or more embodiments with the cover removed. FIG. 2A is a side view of the cleaning tool 100 in a normal state. FIG. 2B is a side view of the cleaning tool 100 in a pushed state. FIG. 2C is an explanatory diagram of a cleaning operation.

In the following description, the various directions are defined as illustrated in FIG. 1A. That is, "front-rear direction" is the direction in which an extension part 30 (or front-side housing 31) extends out from a tool body 10 (or body housing 11), with "front" referring to the side of the extension part 30 as viewed from the tool body 10, and "rear" referring to the opposite side. The "front-rear direction" also refers to the direction in which the tool body 10 and the extension part 30 move relatively to one another. Also, the "front-rear direction" is the pressing direction in which a cleaning element 1 is to be pressed against an object to be cleaned, and is also the direction in which a head 40 protrudes from the housing (more specifically, the front-side housing 31). The "front-rear direction" may also be referred to as "pressing direction". The "front side" may also be referred to as "tip-end side" and the "rear side" may also be referred to as "base-end side". The width direction of the belt-shaped cleaning element 1 is referred to as "left-right direction" or "width direction", with "right" referring to the right-hand side when viewed from the rear side toward the front side, and "left" referring to the opposite side. The "width direction" is a direction orthogonal to the pressing direction in which the cleaning element 1 is to be pressed against an object to be cleaned. The direction perpendicular to the front-rear direction and the left-right direction is referred to as "up-down direction", with "up" referring to the side from which the cleaning element 1 is supplied at an end face (pressing face) of the head 40, and "down" referring to the opposite side.

The cleaning tool 100 is a tool used for cleaning an optical connector 50. Particularly, the cleaning tool 100 of one or more embodiments is for cleaning a shutter-equipped optical connector 50 (described further below). Note, however, that the cleaning tool 100 can be used for cleaning an optical connector without a shutter. The cleaning tool 100 includes a tool body 10 and an extension part 30.

The tool body 10 is a member constituting the body of the cleaning tool 100. The tool body 10 includes a body housing 11 (first housing). The body housing 11 houses such components as a supply reel for supplying a cleaning element 1, and a take-up reel 13 (collection reel) for taking up the used cleaning element 1. An opening is formed in the front side of the body housing 11, and the extension part 30 extends out toward the front side from the opening. A portion (rear part) of the extension part 30 is housed inside the body housing 11. The tool body 10 and the extension part 30 are coupled by a rack-and-pinion mechanism 21, and the body housing 11 houses the rack-and-pinion mechanism 21. The rack-and-pinion mechanism 21 is a mechanism for converting linear motion between the tool body 10 and the extension part 30 into rotary motion. The body housing 11 also houses a spring 22 arranged between the tool body 10 and the extension part 30. The spring 22 is a member for biasing the extension part 30 toward the front side with respect to the tool body 10.

The extension part 30 is a member that extends out from the tool body 10. The extension part 30 includes a front-side housing 31 (second housing) and a head 40.

The front-side housing 31 is a tubular member that houses the head 40. The front-side housing 31 is a member that constitutes the housing of the cleaning tool 100 together with the body housing 11. The front-side housing 31 has an abutment part 31A. The abutment part 31A is a section that butts against an optical connector 50 (more specifically, a connector housing 51) at the time of cleaning. The head 40 is exposed from an opening in an end face 31B on the tip-end side of the front-side housing 31.

The head 40 is a member for pressing the cleaning element 1 against an end face of an optical connector 50. The head 40 is located at an end part (front-side end part) of the extension part 30. The cleaning element 1 is wrapped around a pressing face 41A of the head 40. The cleaning element 1 is exposed to the outside in a manner that the cleaning element 1 can be pressed against an optical connector 50. A portion (front part) of the head 40 is exposed so as to protrude toward the front from the front-side housing 31, whereas a portion (rear part) of the head 40 is arranged inside the front-side housing 31. The head 40 is housed in the front-side housing 31 in a state biased toward the front in a retractable manner. A detailed configuration of the head 40 will be described further below.

As illustrated in FIGS. 2A and 2B, the extension part 30 is movable in the front-rear direction with respect to the tool body 10. In the pushed state illustrated in FIG. 2B, the extension part 30 is retracted into the tool body 10 compared to the normal state illustrated in FIG. 2A.

As illustrated in FIG. 2C, when cleaning an optical connector 50, the cleaning element 1 of the head 40 is pressed against the optical connector 50 (more specifically, an end face of a ferrule of the optical connector 50), and the optical connector 50 (more specifically, the connector housing 51) is made to butt against the abutment part 31A of the extension part 30. In this state, the tool body 10 is moved toward the front side (pushing operation). In this way, the cleaning tool 100 transitions from the normal state illustrated in FIG. 2A to the pushed state illustrated in FIGS. 2B and 2C. After the pushing operation, when the cleaning tool 100 is withdrawn from the optical connector 50, the tool body 10 is moved toward the rear side (pulling operation). In this way, the cleaning tool 100 transitions from the pushed state illustrated in FIGS. 2B and 2C to the normal state illustrated in FIG. 2A.

In a single cleaning operation, a pushing operation and a pulling operation are performed. By the pushing operation and the pulling operation, the tool body 10 and the extension part 30 are moved relative to one another in the front-rear direction. The cleaning tool 100 converts the linear motion between the tool body 10 and the extension part 30 into rotary motion by the rack-and-pinion mechanism 21, and by utilizing this rotary force, the cleaning element 1 is supplied and the used cleaning element 1 is taken-up (collected).

Figure 3A:
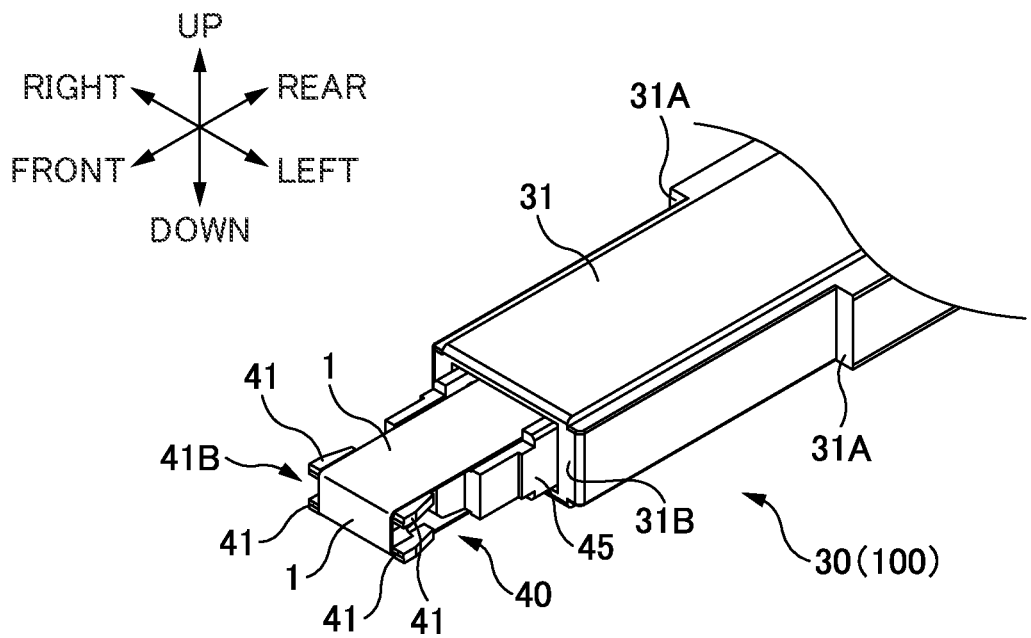
FIG. 3A is perspective views in the vicinity of a head of the cleaning tool.
Figure 3B:
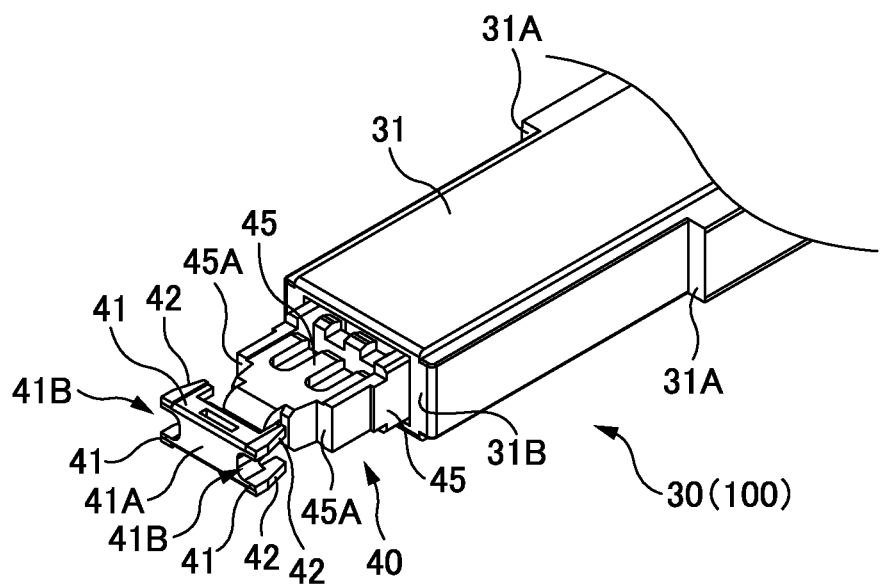
FIG. 3B is perspective views in the vicinity of a head of the cleaning tool.
Figure 4A:
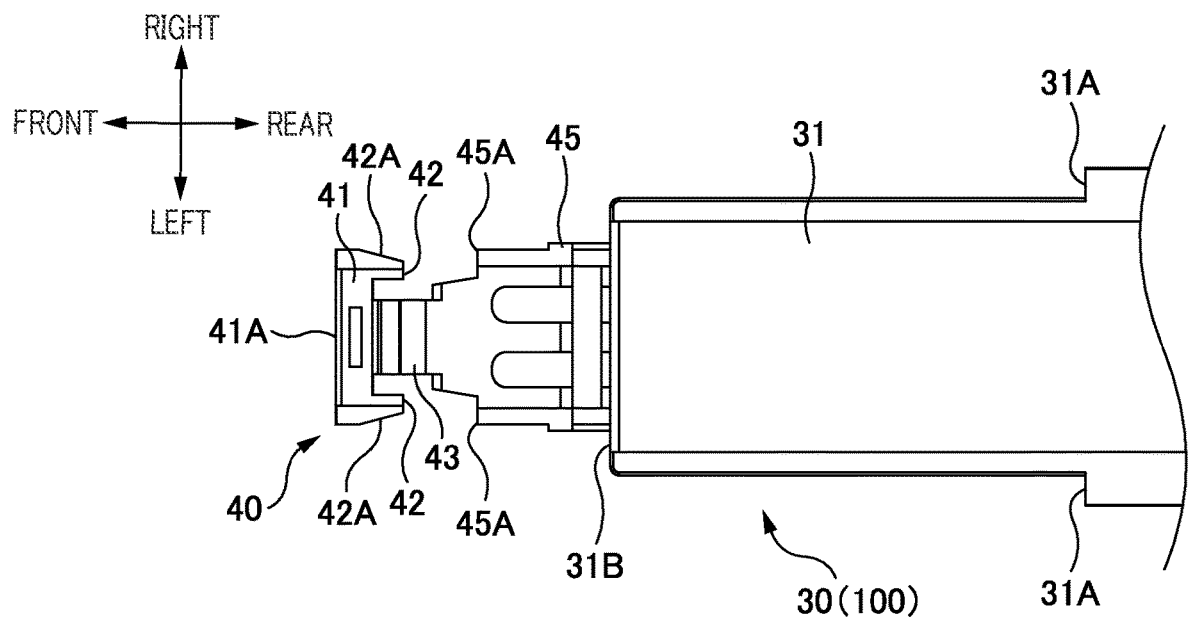
FIG. 4A is a top view in the vicinity of the head.
Figure 4B:
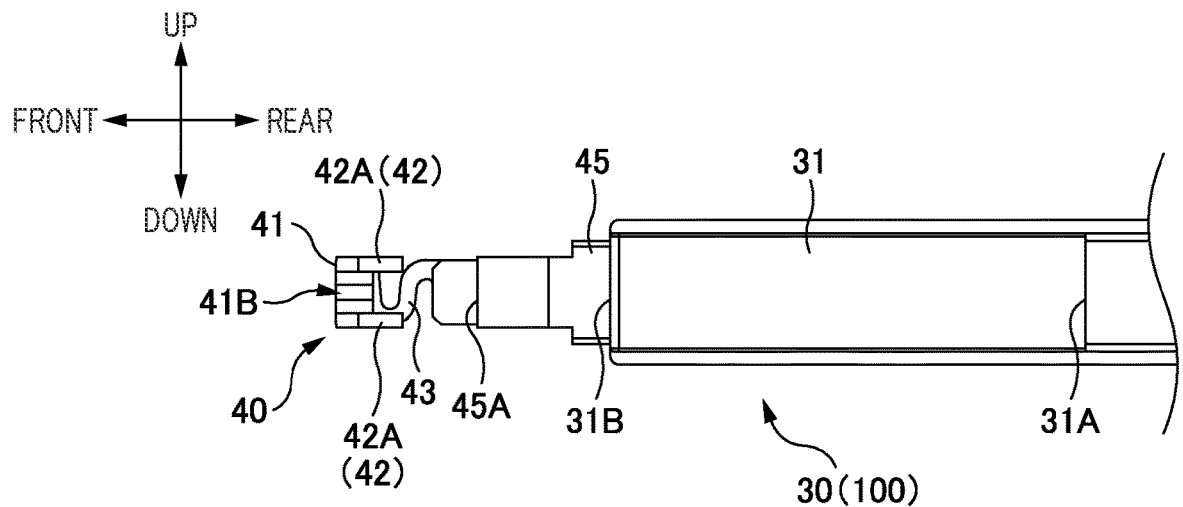
FIG. 4B is a side view in the vicinity of the head.
Figure 4C:
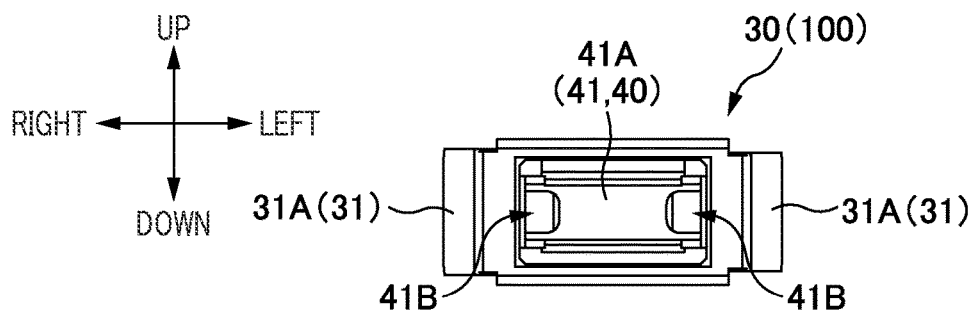
FIG. 4C is a front view in the vicinity of the head.

Head 40:

FIGS. 3A and 3B are perspective views in the vicinity of the head 40 of the cleaning tool 100. FIG. 3A illustrates a state in which the cleaning element 1 is wrapped around the pressing face 41A of the head 40. FIG. 3B illustrates a state in which the cleaning element 1 has been removed. FIG. 4A is a top view in the vicinity of the head 40. FIG. 4B is a side view in the vicinity of the head 40. FIG. 4C is a front view in the vicinity of the head 40.

The head 40 is a member for pressing the cleaning element 1 against an end face of an optical connector 50 (more specifically, an end face of a ferrule). The head 40 includes a pressing part 41, a neck part 43, and a guide part 45. A portion (e.g., the pressing part 41, the neck part 43, and a later-described shoulder part 45A) of the head 40 protrudes toward the tip-end side from the front-side housing 31, whereas a portion (e.g., an end part on the base-end side of the later-described guide part 45) of the head 40 is arranged inside the front-side housing 31.

The pressing part 41 is a section for pressing the cleaning element 1 against an object to be cleaned. The pressing part 41 is a section having a pressing face 41A and is a section (head part) arranged at the front-side end part of the head 40. The pressing face 41A is a surface for pressing the cleaning element 1 against an optical connector 50. The front-side end face of the pressing part 41 constitutes the pressing face 41A. The cleaning element 1 is wrapped around the pressing face 41A. Unused cleaning element 1 is supplied to the pressing face 41A from the upper side, and used cleaning element 1 is sent out from the pressing face 41A to the lower side. In one or more embodiments, the cleaning element 1, which has a belt-like shape, is wrapped around the pressing face 41A. As illustrated in FIG. 3B, the pressing part 41 protrudes more toward the tip-end side than the end face of the housing (more specifically, the front-side housing 31), and is exposed from the housing. Thus, as illustrated in FIG. 3B, the cleaning element 1, which is wrapped around the pressing face 41A, is exposed from the housing. The pressing part 41 is configured so as to have a wider width than the width of the belt-shaped cleaning element 1. Stated differently, the pressing face 41A is configured so as to have a wider width than the width of the belt-shaped cleaning element 1. A pair of recess parts 41B is formed respectively on the left and right sides of the pressing face 41A. The recess parts 41B are sections for avoiding interference with guide pins protruding from an optical connector 50 (ferrule) to be cleaned. Stated differently, at the time of cleaning an optical connector 50 having protruding guide pins, the guide pins are insertable through the respective recess parts 41B.

In one or more embodiments, the pressing part 41 has ear parts 42. The ear parts 42 will be described further below. Note, however, that the pressing part 41 does not have to include the ear parts 42.

The neck part 43 is a section provided on the rear side of the pressing part 41 (see FIGS. 4A and 4B). The neck part 43 is a section (i.e., a narrowed section) having a dimension narrower than the pressing part 41 in the width direction. The neck part 43 is arranged between the pressing part 41 and the guide part 45. The neck part 43 is configured in an elastically deformable manner. Stated differently, the neck part 43 functions as a deforming part. By elastically deforming the neck part 43, the pressing part 41 (pressing face 41A) can be tilted in accordance with the inclination of the end face of an optical connector 50. More specifically, regardless of whether the end face of an optical connector 50 to be cleaned is perpendicular to the front-rear direction or is an inclined end surface, by elastically deforming the neck part 43, the pressing face 41A can be tilted so as to conform to the end face of the optical connector 50, and the cleaning element 1 can be pressed against the end face of the optical connector 50.

The neck part 43 is made as a narrow-width section to make it elastically deformable. In one or more embodiments, the dimension of the neck part 43 in the width direction (left-right direction) is shorter than the dimension of the pressing part 41 in the width direction (see FIG. 4A). Hence, when viewed from above, the pressing part 41 and the neck part 43 form a T-shape, and the pressing part 41 protrudes laterally in the width direction with respect to the neck part 43. Further, the dimension of the neck part 43 in the width direction is shorter than the dimension of the guide part 45 in the width direction. Hence, as illustrated in FIG. 4A, the neck part 43 is shaped so as to be narrowed in the width direction with respect to the pressing part 41 and the guide part 45. As illustrated in FIGS. 3B and 4A, the neck part 43 protrudes more toward the tip-end side than the end face 31B of the housing (more specifically, the front-side housing 31), and is exposed from the housing.

The guide part 45 is a section for guiding the cleaning element 1 in the front-rear direction and for guiding the head 40 in the front-rear direction with respect to the front-side housing 31. The guide part 45 is a section that is long in the front-rear direction, and except for its front part, is housed inside the front-side housing 31. The guide part 45 is housed in the front-side housing 31 in a state biased toward the front in a retractable manner. The upper and lower surfaces of the guide part 45 constitute guide faces for guiding the cleaning element 1 in the front-rear direction. The cleaning element 1 passes through a gap formed between the upper and lower surfaces of the guide part 45 and the upper and lower inner surfaces of the front-side housing 31. The side surfaces of the guide part 45 constitute guide faces for guiding the head 40 in the front-rear direction with respect to the front-side housing 31. The side surfaces of the guide part 45 are arranged so as to respectively oppose the inner side surfaces of the front-side housing 31, and thus, the side surfaces of the guide part 45 can be made to slide in the front-rear direction with respect to the front-side housing 31.

The guide part 45 is a section having a wider width than the neck part 43 (see FIG. 4A). Hence, a step-like section is formed between the guide part 45 and the neck part 43. In the description below, this step-like section at the front edge of the guide part 45 (i.e., the section protruding more toward outside in the width direction than the neck part 43) may be referred to as "shoulder part 45A". The shoulder part 45A is a section on the rear side of the neck part 43, and is a section protruding more toward outside (i.e., outward in the width direction) than the neck part 43. As illustrated in FIGS. 3B and 4A, the shoulder part 45A is provided between the neck part 43 and the housing (more specifically, the front-side housing 31). The shoulder part 45A protrudes more toward the tip-end side than the end face 31B of the housing, and is exposed from the housing.

Figure 5A:
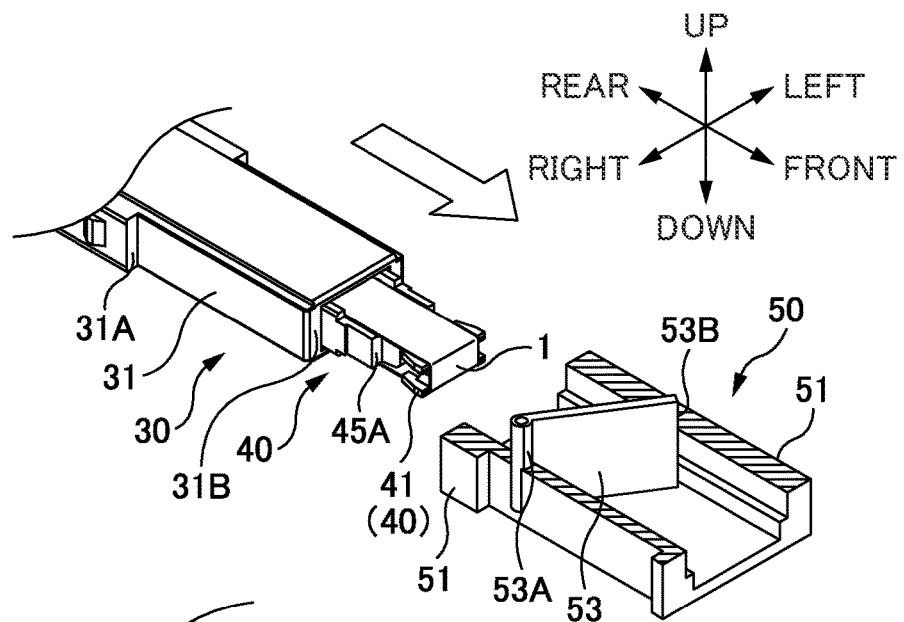
FIG. 5A is explanatory diagrams illustrating a state in the vicinity of the head and an optical connector at the time of cleaning.
Figure 5B:
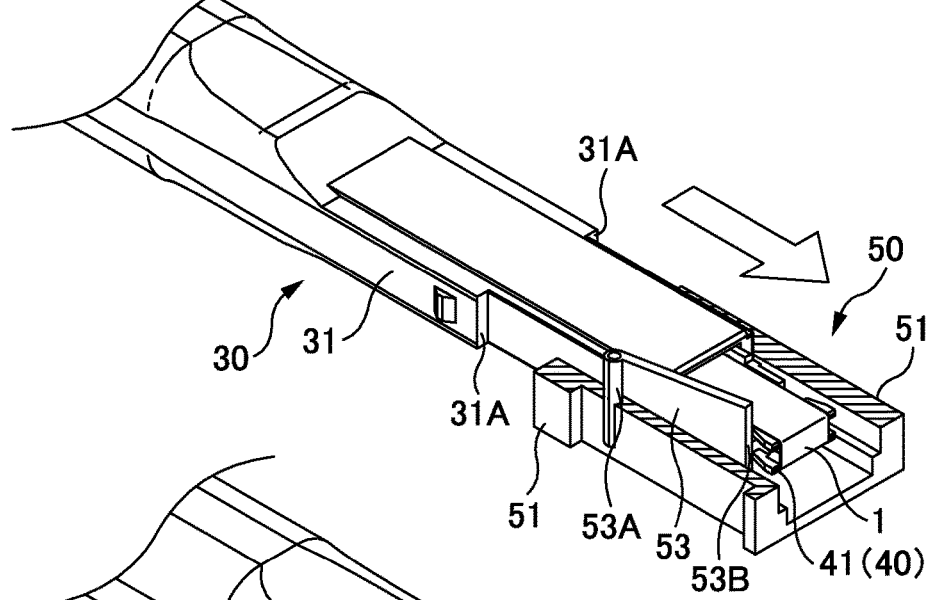
FIG. 5B is explanatory diagrams illustrating a state in the vicinity of the head and an optical connector at the time of cleaning.
Figure 5C:
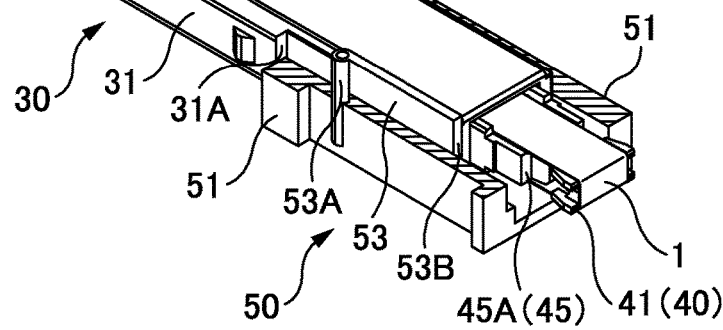
FIG. 5C is explanatory diagrams illustrating a state in the vicinity of the head and an optical connector at the time of cleaning.

FIGS. 5A to 5C are explanatory diagrams illustrating a state in the vicinity of the head 40 and an optical connector 50 at the time of cleaning.

The optical connector 50 to be cleaned is a shutter-equipped optical connector 50. The optical connector 50 includes a ferrule (not illustrated), a connector housing 51, and a shutter 53. The ferrule (not illustrated) is a member for retaining an end part of optical fiber. The end face of the ferrule is the object to be cleaned, and the cleaning element 1 is pressed against the end face of the ferrule. The connector housing 51 is a member (housing) for housing the ferrule. The connector housing 51 may be referred to as an adapter.

The shutter 53 is a member for shielding optical signals. The shutter 53 shields optical signals emitted from the ferrule (not illustrated) and prevents the optical signals from escaping outside. The shutter 53 also serves as a member for preventing the intrusion of dust into the connector housing 51. The shutter 53 is arranged inside the tubular connector housing 51 and is openable and closable. As illustrated in FIG. 5A, in a normal state, the shutter 53 is in a closed state, and thereby optical signals emitted from the ferrule (not illustrated) are shielded. When a counterpart optical connector (not illustrated) is inserted into the optical connector 50, the counterpart optical connector presses the shutter 53 open, and thereby, the respective ferrules of the optical connectors butt against one another and establish optical connection. The shutter 53 is configured so as not to contact the ferrule (not illustrated) inside the connector housing 51 when pushed open.

The shutter 53 opens and closes about an opening/closing mechanism 53A. In one or more embodiments, the opening/closing mechanism 53A is constituted by a hinge, and the shutter 53 opens and closes about the rotation axis of the hinge. Note, however, that the opening/closing mechanism 53A is not limited to a hinge. For example, the shutter 53 may be made by bending a single metal plate, and the bent section may serve as an opening/closing mechanism 53A, so that the shutter 53 can be opened and closed by elastically deforming the bent section (deformed part).

In one or more embodiments, as illustrated in FIG. 5A, the opening/closing mechanism 53A is provided on the right-side inner wall surface of the connector housing 51. Note, however, that the opening/closing mechanism 53A of the shutter 53 may be provided on the left-side inner wall surface of the connector housing 51. In one or more embodiments, the opening/closing mechanism 53A is provided on one side of the connector housing 51's inner wall surface in the width direction, and a single shutter 53 is provided in a single-door fashion. Note, however, that the opening/closing mechanism 53A may be provided to each of the connector housing 51's inner wall surfaces on both sides in the width direction, and a pair of shutters 53 provided to the respective sides in the width direction may be provided in a double-door fashion.

As illustrated in FIG. 5A, before the head 40 is inserted into the optical connector 50 (more specifically, the connector housing 51), the shutter 53 is in a closed state. As illustrated in FIGS. 5B and 5C, when the head 40 is inserted into the optical connector 50 (more specifically, the connector housing 51), the shutter 53 is pushed open by the head 40 (more specifically, the pressing part 41, the shoulder part 45A, etc.) and the front-side housing 31, and thereby the shutter 53 assumes an opened state. The extension part 30 (including the head 40) will be inserted into the optical connector 50 (more specifically, the connector housing 51) until the abutment part 31A of the front-side housing 31 butts against the edge of the opening of the connector housing 51, as illustrated in FIG. 5C. It should be noted that, by further moving the tool body 10 toward the front side (i.e., by performing the pushing operation) after the abutment part 31A of the front-side housing 31 has butted against the edge of the opening of the connector housing 51 as illustrated in FIG. 5C, the tool body 10 moves toward the front side with respect to the extension part 30 and assumes a pushed state (see FIGS. 2B and 2C).

As described above, the shutter 53 is formed so as not to contact the ferrule (not illustrated) when it is pushed open. Hence, the ferrule is located more toward the inner side of the connector housing 51 (i.e., toward the front side as viewed from the head 40) than the shutter 53's end part 53B illustrated in FIGS. 5B and 5C. So, at the time of cleaning the thus-arranged ferrule with the cleaning tool 100 (i.e., at the time of pressing the cleaning element 1 against the ferrule with the head 40), the pressing part 41 of the head 40 will be located more toward the front side than the end part 53B of the shutter 53, as illustrated in FIGS. 5B and 5C. In a state where the abutment part 31A of the front-side housing 31 is in abutment against the edge of the opening of the connector housing 51 as illustrated in FIG. 5C, the pressing part 41 of the head 40 is located more toward the front side than the end part 53B of the shutter 53.

Figure 6:
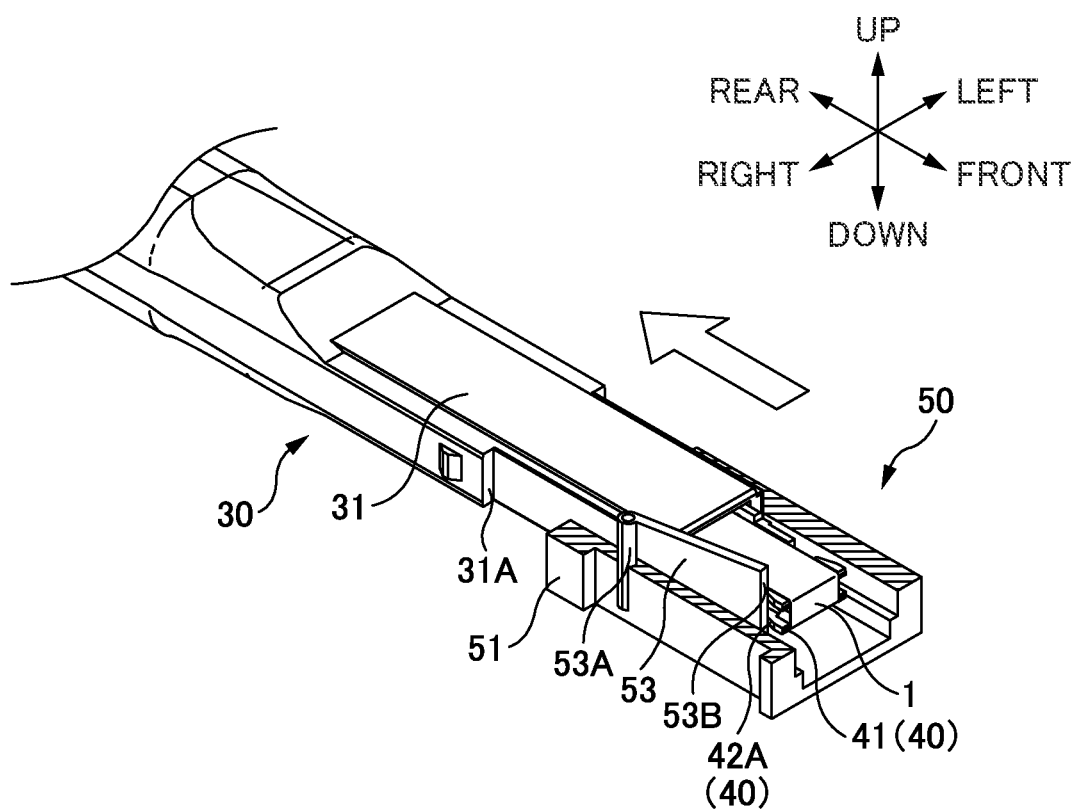
FIG. 6 is an explanatory diagram illustrating a state where the cleaning tool is being withdrawn from an optical connector.

FIG. 6 is an explanatory diagram illustrating a state where the cleaning tool 100 is being withdrawn from the optical connector 50. As the cleaning tool 100 is being withdrawn from the optical connector 50 from the state where the abutment part 31A of the front-side housing 31 is in abutment against the edge of the opening of the connector housing 51 (see FIG. 5C), the pressing part 41 of the head 40 arrives at the position of the end part 53B of the shutter 53 as illustrated in FIG. 6. At this time, the shutter 53 may get caught on the head 40 (particularly, the narrowed section between the pressing part 41 and the shoulder part 45A), and there is a possibility that the cleaning tool 100 cannot be detached.

Figure 7A:
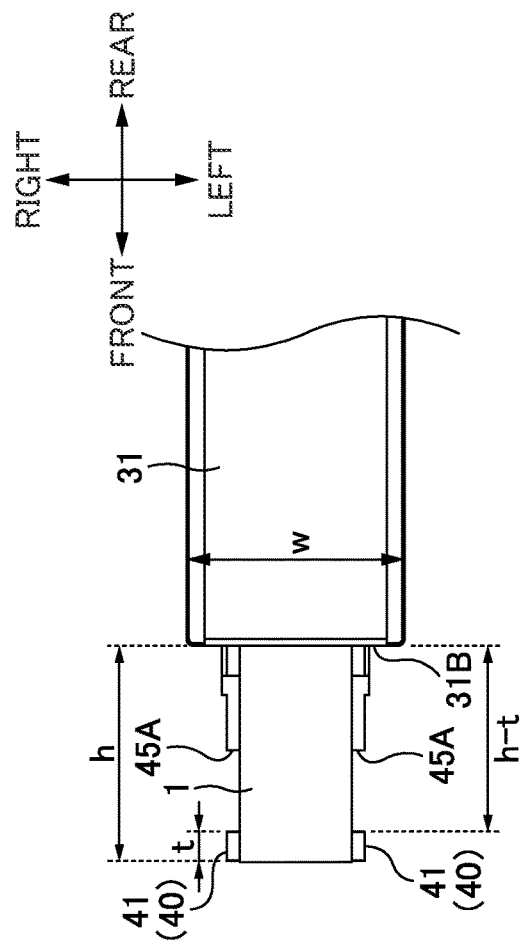
FIG. 7A is an explanatory diagram of dimensions of various members.
Figure 7B:
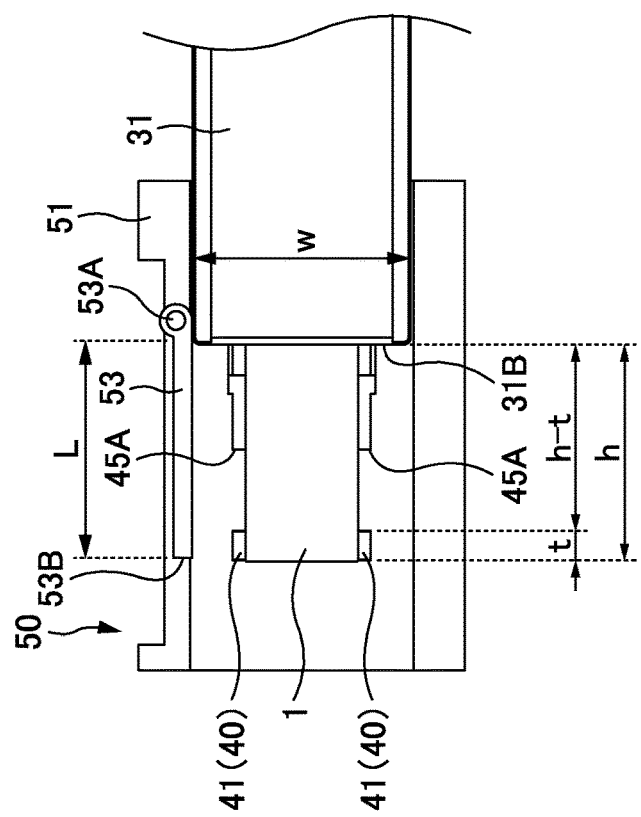
FIG. 7B is an explanatory diagram illustrating positional relationships between various members at the time of opening/closing of a shutter.

FIG. 7A is an explanatory diagram of dimensions of various members. FIG. 7B is an explanatory diagram illustrating positional relationships between various members at the time of opening/closing of the shutter 53.

The length of the shutter 53 is defined as "L", as illustrated on the left-hand side of FIG. 7A. The length L of the shutter 53 is the length of its protruding section inside the opening of the connector housing 51, and is the length between the position where the front-side housing 31 comes into contact and the end part 53B. The inner dimension of the opening of the connector housing 51 (i.e., the distance between the inner wall surfaces of the connector housing 51 in the width direction) is defined as "H".

Further, the length (width) of the front-side housing 31 in the width direction is defined as "w", as illustrated on the right-hand side of FIG. 7B. The length w is the length (width), in the width direction, of the tip-end part of the front-side housing 31 (i.e., the end part located more toward the tip-end side than the abutment part 31A). The protrusion length of the head 40 protruding out from the end face 31B of the front-side housing 31 is defined as "h". The protrusion length h is the length, in the front-rear direction (pressing direction), between the end face 31B of the front-side housing 31 and the pressing face 41A of the pressing part 41 of the head 40. The length of the pressing part 41 in the front-rear direction (pressing direction) is defined as "t". The length t is the length, in the front-rear direction (pressing direction), between the pressing face 41A of the pressing part 41 of the head 40 and the base-end-side end part of the pressing part 41. As described further below, in cases where the pressing part 41 has an ear part 42, the ear part 42's end part on the base-end side (i.e., the front-side housing 31 side) serves as the base-end-side end part of the pressing part 41. The protrusion length from the end face 31B of the front-side housing 31 to the pressing part 41 protruding therefrom can be expressed as "h−t". The protrusion length h−t is the length, in the front-rear direction (pressing direction), between the end face 31B of the front-side housing 31 and the base-end-side end part of the pressing part 41.

To make the shutter 53 prevent intrusion of dust into the connector housing 51, there is a need to eliminate any gap between the end part 53B of the shutter 53 and the inner wall surface of the connector housing 51. Hence, the length L of the shutter 53 is substantially equal to distance H (L≈H). Further, in order to suppress positional misalignment, in the width direction, of the cleaning tool 100 with respect to the connector housing 51, H and w are set so as to be substantially equal (H≈w). As described above, L≈H and H≈w; hence, the length L of the shutter 53 is substantially equal to the length w (L≈w).

Further, the shutter 53 opens as a result of contact of the front-side housing 31 with the shutter 53 as illustrated in FIG. 7B, whereas the shutter 53 closes as a result of disengagement of the front-side housing 31 from the shutter 53. Hence, as illustrated in FIG. 7B, immediately after opening/closing of the shutter 53, the end part 53B of the shutter 53 is located at a position separated from the end face 31B of the front-side housing 31 by the length L. Further, immediately after opening/closing of the shutter 53, the base-end-side end part of the pressing part 41 is located at a position separated from the end face 31B of the front-side housing 31 by the length h−t.

To keep the end part 53B of the shutter 53 from getting caught on the pressing part 41, the end part 53B of the shutter 53 may be located at a position more toward the tip-end side than the rear-side end part of the pressing part 41 immediately after opening/closing of the shutter 53. Stated differently, the condition for keeping the end part 53B of the shutter 53 from getting caught on the pressing part 41 can be expressed as L≥h−t. Here, as described above, L and w are substantially equal (L≈w), so the condition for keeping the end part 53B of the shutter 53 from getting caught on the pressing part 41 can be expressed as w≥h−t. Stated differently, the end part 53B of the shutter 53 can be suppressed from getting caught on the pressing part 41 by satisfying this conditional expression (w≥h−t), i.e., by making the length w of the front-side housing 31 in the width direction equal to or greater than the protrusion length h−t from the front-side housing 31 to the pressing part 41 protruding therefrom.

The conditional expression w≥h−t can be rewritten as t≥h−w. Stated differently, the end part 53B of the shutter 53 can be suppressed from getting caught on the pressing part 41 if the length t of the pressing part 41 in the front-rear direction (pressing direction) is equal to or greater than a value (h−w) found by subtracting the width w of the front-side housing 31 from the protrusion length h of the head 40 protruding from the end face 31B of the front-side housing 31.

In one or more embodiments, the pressing part 41's dimension t in the front-rear direction can be elongated by providing ear parts 42 to the pressing part 41, as described below. In this way, it is possible to achieve a structure capable of easily satisfying the conditional expression w≥h−t (or the conditional expression t≥h−w), thereby making it easy to suppress the shutter 53 from getting caught on the head 40. In cases where an ear part 42 is provided to the pressing part 41, the ear part 42's end part (rear end) on the base-end side (the front-side housing 31 side) serves as the base-end-side end part of the pressing part 41. Stated differently, the protrusion length h−t is the length, in the front-rear direction (pressing direction), between the end face 31B of the front-side housing 31 and the ear part 42's end part on the base-end side (the front-side housing 31 side).

Ear Part 42:

FIG. 8A is an explanatory diagram of the head 40 of one or more embodiments. FIG. 8B is an explanatory diagram of a head 40 of a reference example. FIG. 9A is an explanatory diagram illustrating a state where the cleaning tool 100 of one or more embodiments is being withdrawn from an optical connector 50. FIG. 9B is an explanatory diagram illustrating a state where the cleaning tool 100 of the reference example is being withdrawn from an optical connector 50. The pressing part 41 of the reference example does not have an ear part 42.

The ear part 42 is a section for suppressing the end part 53B of the shutter 53 from getting caught on the pressing part 41. The ear part 42 is a section protruding toward the rear side (the front-side housing 31 side) from the rear surface of the pressing part 41. Each of the pressing part 41's left and right edges is provided with the ear part 42. Since the ear part 42 is shaped so as to protrude toward the rear side from the rear surface of the pressing part 41, the ear part 42 arrives at the position of the end part 53B of the shutter 53 before the pressing part 41 when the cleaning tool 100 is withdrawn from the optical connector 50. Here, as illustrated in FIG. 9A, at the time of withdrawing the cleaning tool 100 from the optical connector 50, the end part 53B of the shutter 53 engages with the ear part 42, and the end part 53B of the shutter 53 moves onto the side surface of the pressing part 41 via the ear part 42. In this way, in one or more embodiments, the end part 53B of the shutter 53 can be suppressed from getting caught on the pressing part 41.

The one or more embodiments include a plurality of ear parts 42 provided respectively on the pressing part 41's opposite ends in the width direction (see FIG. 8A). The ear parts 42 are arranged so as to sandwich the front part of the neck part 43 from the width direction (left-right direction) (see FIG. 8A). By providing the pair of ear parts 42 so as to sandwich the front part of the neck part 43, the end part 53B of the shutter 53 can be suppressed from getting caught on the pressing part 41 even when the cleaning tool 100 is used upside down.

In one or more embodiments, a gap is formed between the neck part 43 and the ear part 42. More specifically, a gap is formed between the neck part 43's side surface in the width direction and the inner surface of each of the ear parts 42, which are provided on the respective sides in the width direction. This configuration allows elastic deformation of the neck part 43. (If there is no gap between the ear part 42 and the neck part 43 and the ear part 42 and the neck part 43 are connected, it will be difficult for the neck part 43 to elastically deform.)

In one or more embodiments, there is no step in the side surface of the pressing part 41 (i.e., there is no step between the side surface of the ear part 42 and the side surface of the section of the pressing part 41 other than the ear part 42), and the side surface of the section of the pressing part 41 other than the ear part 42 is continuous with the side surface of the ear part 42. With this configuration, the end part 53B of the shutter 53 can smoothly move onto the side surface of the pressing part 41 via the ear part 42, and the end part 53B of the shutter 53 can be suppressed from getting caught on the pressing part 41. Note that, even if there is a step between the side surface of the ear part 42 and the side surface of the section of the pressing part 41 other than the ear part 42 and there is thus a step in the side surface of the pressing part 41, such a step is smaller than the step between the neck part 43 and the rear surface of the pressing part 41 of the reference example (see FIG. 8B); thus, the end part 53B of the shutter 53 can be suppressed from getting caught on the pressing part 41 compared to the reference example. However, there may be no step in the side surface of the pressing part 41 as in one or more embodiments.

The side surface of the ear part 42 is an inclined surface 42A. The inclined surface 42A of the ear part 42 is a surface which tapers inwardly toward the rear side. Stated differently, the normal line of the inclined surface 42A of the ear part 42 is along a direction toward outside in the width direction as well as in a direction toward the rear side (see FIG. 8A). Hence, the rear edge (rear-side end part) of the inclined surface 42A of the ear part 42 is located more inward in the width direction (left-right direction) than the front edge of the inclined surface 42A. The front edge of the inclined surface 42A of the ear part 42 is located at the rear edge of the side surface of the pressing part 41, and thus, there is no step in the side surface of the pressing part 41 (i.e., there is no step between the side surface of the ear part 42 and the side surface of the section of the pressing part 41 other than the ear part 42), and the side surface of the section of the pressing part 41 other than the ear part 42 is continuous with the side surface of the ear part 42. Since the side surface of the ear part 42 is formed as an inclined surface 42A, the inclined surface 42A can guide the end part 53B of the shutter 53 onto the side surface of the pressing part 41. Thus, the end part 53B of the shutter 53 can be suppressed from getting caught on the pressing part 41.

The end part (rear edge) of the inclined surface 42A of the ear part 42 is located more inward than the shoulder part 45A in the width direction (left-right direction). With this configuration, the end part 53B of the shutter 53, which has fallen inward of the shoulder part 45A, can be suppressed from getting caught on the pressing part 41 when the cleaning tool 100 is being withdrawn from the optical connector 50.

In one or more embodiments, as illustrated in FIG. 4B, each edge, in the width direction, of the pressing part 41 has two ear parts 42 on the upper and lower sides, respectively. Stated differently, in one or more embodiments, each of the four corners on the rear surface of the pressing part 41 has a respective ear part 42. A gap is formed between the two upper and lower ear parts 42. Stated differently, the two ear parts 42 are arranged with a gap therebetween in the up-down direction, which is perpendicular to the front-rear direction (pressing direction) and the width direction. The gap between the two upper and lower ear parts 42 is in communication with a corresponding one of the recess parts 41B (see FIG. 3B) formed in the pressing face 41A. Hence, in cases where there is a guide pin protruding from the optical connector 50 (ferrule (not illustrated)) to be cleaned, the guide pin is inserted, at the time of cleaning, through the recess part 41B and is also inserted between the pair of ear parts 42 respectively arranged on the upper and lower sides. With this configuration, it is possible to avoid interference between the ear parts 42 and the respective guide pins protruding from the optical connector 50 (ferrule (not illustrated)) to be cleaned.

Modified Example

FIG. 10A is an explanatory diagram of a head 40 of a modified example. FIG. 10A is an explanatory diagram illustrating a state where a cleaning tool 100 of the modified example is being withdrawn from an optical connector 50.

Also in the modified example, the ear parts 42 are shaped so as to protrude toward the rear side from the rear surface of the pressing part 41. Also in the modified example, as illustrated in FIG. 10B, at the time of withdrawing the cleaning tool 100 from the optical connector 50, the end part 53B of the shutter 53 engages with the ear part 42, and the end part 53B of the shutter 53 moves onto the side surface of the pressing part 41 via the ear part 42. In this way, also in the modified example, the end part 53B of the shutter 53 can be suppressed from getting caught on the pressing part 41.

In the modified example, the side surface of the ear part 42 is perpendicular to the left-right direction, and the side surface of the ear part 42 is formed in a planar shape that is flush with the side surface of the pressing part 41. Stated differently, in the modified example, no inclined surface 42A is formed on the side surface of the ear part 42. Even if the ear part 42 has no inclined surface 42A as in the modified example, the end part 53B of the shutter 53 can be suppressed from getting caught on the pressing part 41. Note that, also in the modified example, there is no step in the side surface of the pressing part 41, and the side surface of the section of the pressing part 41 other than the ear part 42 is continuous with the side surface of the ear part 42. With the configuration of the modified example—wherein there is no step in the side surface of the pressing part 41, and the side surface of the section of the pressing part 41 other than the ear part 42 is continuous with the side surface of the ear part 42—the end part 53B of the shutter 53 can smoothly move onto the side surface of the pressing part 41 via the ear part 42, and the end part 53B of the shutter 53 can be suppressed from getting caught on the pressing part 41.

Other Embodiments

The foregoing embodiments are for facilitating the understanding of the present invention and are not to be construed as limiting the present invention. The present invention can be modified and/or improved without departing from the gist thereof, and it goes without saying that the present invention encompasses equivalents thereof.

REFERENCE SIGNS LIST

1: Cleaning element
10: Tool body
11: Body housing
12: Supply reel
13: Take-up reel
21: Rack-and-pinion mechanism
22: Spring
30: Extension part
31: Front-side housing
31A: Abutment part
31B: End face
40: Head
41: Pressing part
41A: Pressing face
41B: Recess part
42: Ear part
42A: Inclined surface
43: Neck part
45: Guide part
45A: Shoulder part
50: Optical connector
51: Connector housing
53: Shutter
53A: Opening/closing mechanism
53B: End part
100: Cleaning tool

The invention claimed is:

1. A cleaning tool comprising:
a head including:
  a pressing part that presses a cleaning element against an object to be cleaned in a pressing direction, and having a first dimension in a width direction orthogonal to the pressing direction; and
  a neck part having a second dimension smaller than the first dimension in the width direction; and
a housing that houses the head except for the pressing part and neck part, wherein the pressing part and neck part both protrude from an end face of the housing in the pressing direction such that an entirety of the pressing part and an entirety of the neck part are exposed outside the housing when viewed in the width direction and an up-down direction orthogonal to the pressing direction and the width direction, wherein
a length of the housing in the width direction is equal to or greater than a length of the head from the end face of the housing to the pressing part in the pressing direction.

2. The cleaning tool according to claim 1, wherein the pressing part has an ear part protruding toward the housing and disposed at an end part of the pressing part in the width direction.

3. The cleaning tool according to claim 2, wherein the ear part has an inclined side surface that tapers inwardly in the width direction toward the housing.

4. The cleaning tool according to claim 3, wherein
the head includes a shoulder part disposed between the neck part and the housing,
the shoulder part protrudes outward in the width direction with respect to the neck part, and
an end part of the inclined side surface is disposed inward with respect to the shoulder part in the width direction.

5. The cleaning tool according to claim 1, wherein
the pressing part has a pair of ear parts respectively disposed at opposing end parts of the pressing part in the width direction, and
the ear parts sandwich the neck part in the width direction.

6. The cleaning tool according to claim 5, wherein a gap is formed between the neck part and each of the ear parts.

7. The cleaning tool according to claim 1, wherein
the pressing part has a recess through which a guide pin is inserted during cleaning,
an end part, in the width direction, of the pressing part has two ear parts protruding toward the housing and disposed with a gap therebetween in the up-down direction, and
during cleaning, the guide pin is inserted through the recess and in the gap.

* * * * *